Sept. 19, 1950  G. C. PITTENGER ET AL  2,522,635
HOG FEEDER
Filed Feb. 9, 1946  3 Sheets-Sheet 1

INVENTORS
GLENN C. PITTENGER &
DEXTER R. THORNHILL

BY G. E. Huffman
ATTORNEY

Sept. 19, 1950     G. C. PITTENGER ET AL     2,522,635
HOG FEEDER

Filed Feb. 9, 1946     3 Sheets-Sheet 2

INVENTORS
GLENN C. PITTENGER &
DEXTER R. THORNHILL

BY *[signature]*
ATTORNEY

Sept. 19, 1950 G. C. PITTENGER ET AL 2,522,635
HOG FEEDER
Filed Feb. 9, 1946 3 Sheets-Sheet 3

INVENTORS
GLENN C. PITTENGER &
DEXTER R. THORNHILL
BY
ATTORNEY

Patented Sept. 19, 1950

2,522,635

UNITED STATES PATENT OFFICE 2,522,635

HOG FEEDER

Glenn C. Pittenger, St. Louis, and Dexter R. Thornhill, Gray Summit, Mo., assignors to Ralston Purina Company, St. Louis, Mo., a corporation of Missouri Application February 9, 1946, Serial No. 646,527

5 Claims. (Cl. 119—54)

1

This invention relates to improvements in hog feeders, one of its objects being to provide a feeder construction in which the elements are so related and assembled as to permit ready accessibility to all parts of the device for cleaning, adjustment, and repairs, without sacrificing rigidity and durability in use.

Figure 1:
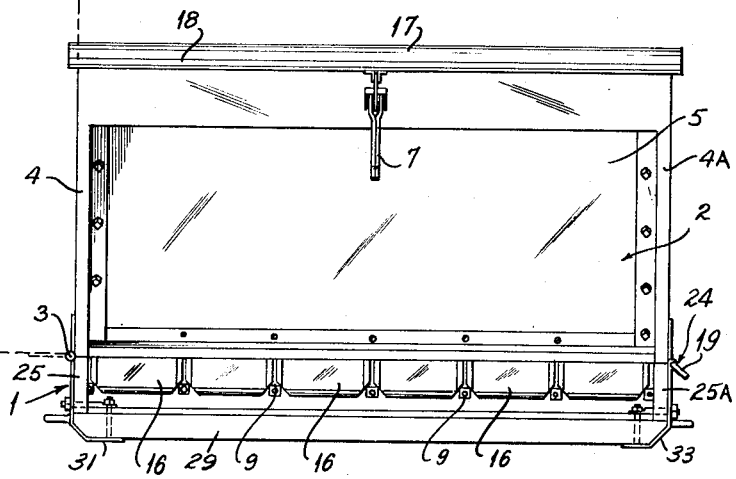
Figure 3:
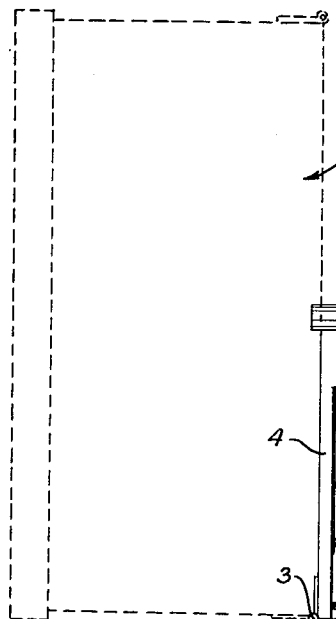
Figure 2:
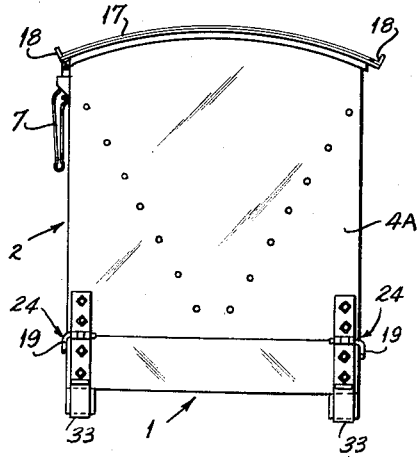
Figure 4:
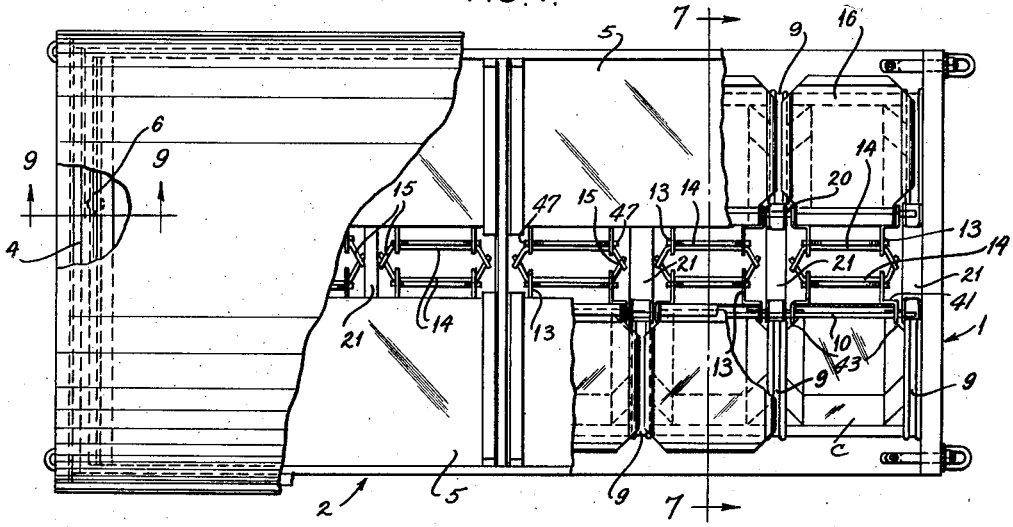
Figure 7:
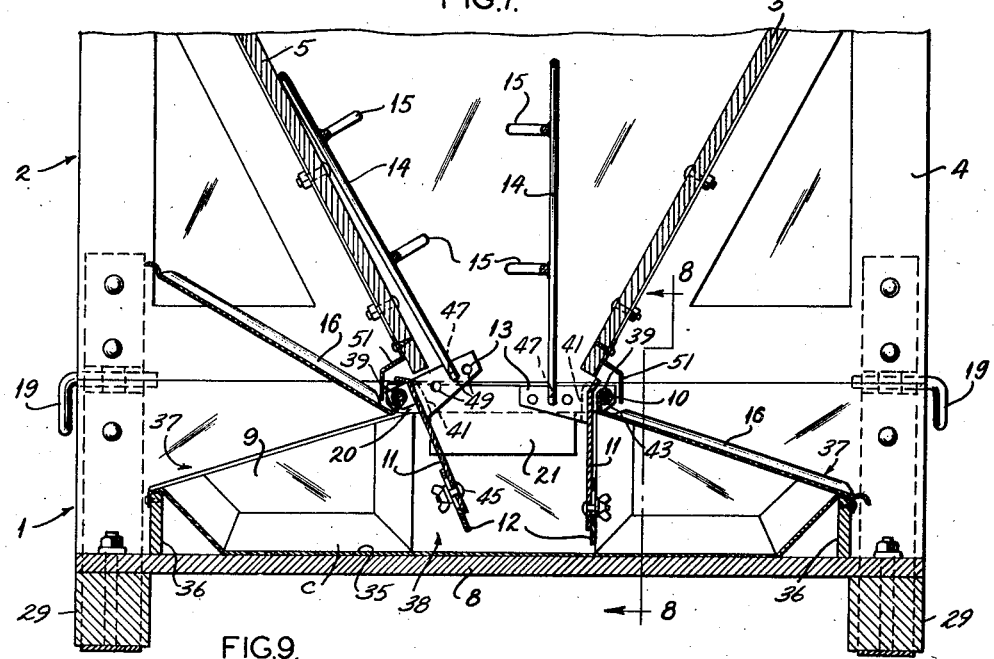
Figure 9:
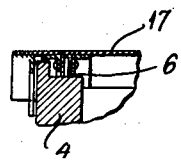
Figure 5:
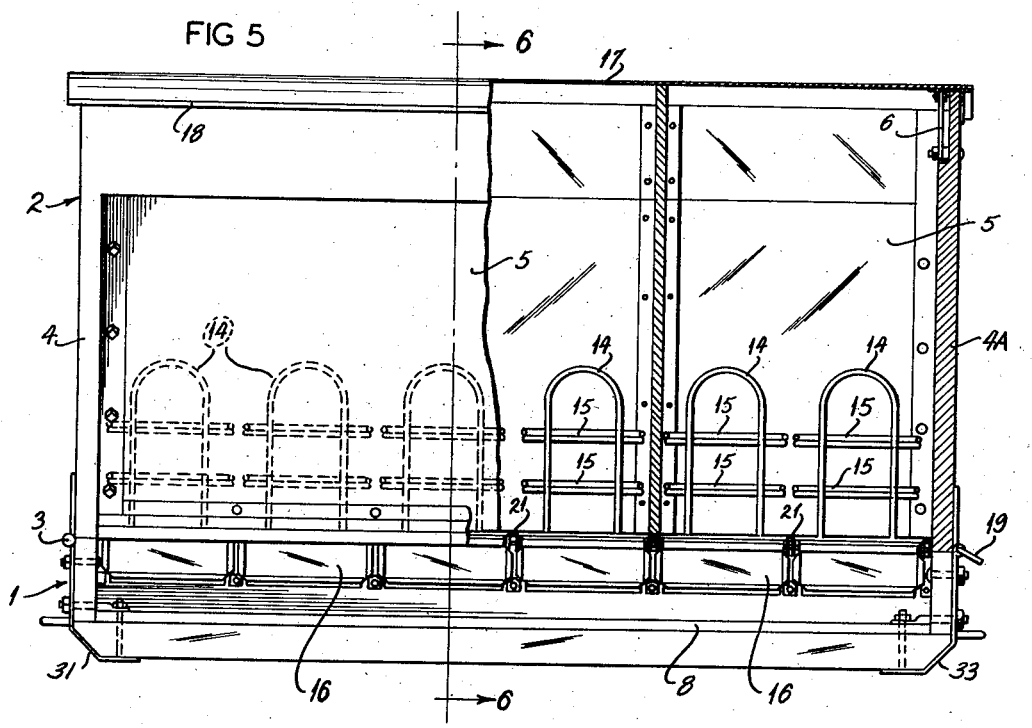
Figure 6:
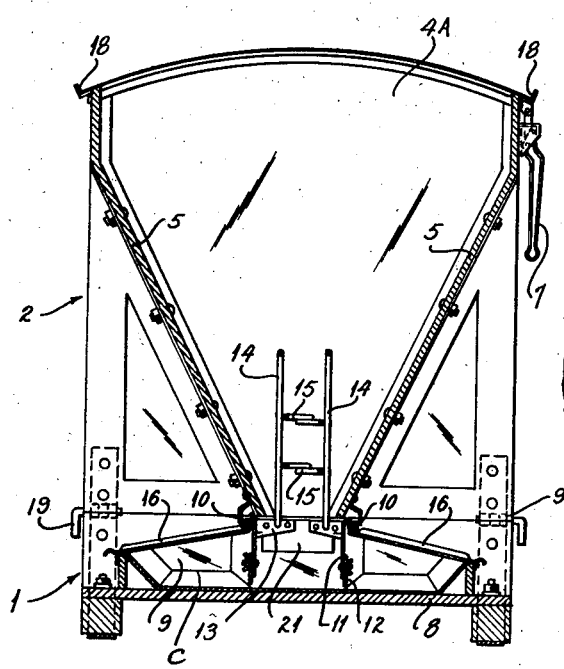
Figure 8:
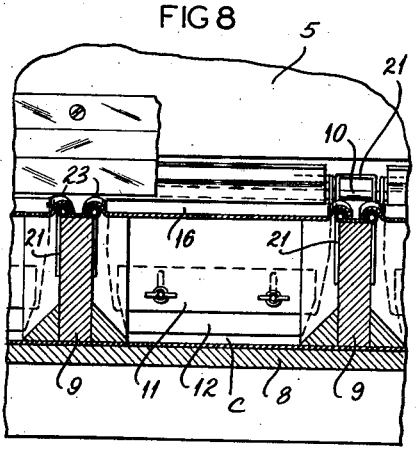

In the accompanying drawings which illustrate a feeder embodying this invention, Figure 1 is a side elevation and showing in dotted lines the position to which the upper part of the feeder may be brought to render accessible parts mounted in the base portion; Figure 2 is an end elevation; Figure 3 is an end elevation similar to Figure 2 but from the other end and with parts broken away and showing the roof of the feeder in raised position; Figure 4 is a top view, portions of the roof, of certain hopper walls, and of a feed compartment cover being broken away; Figure 5 is a side elevational view with a portion of the hopper wall broken away; Figure 6 is a cross-sectional view on the line 6—6 of Figure 5; Figure 7 is an enlarged cross-sectional view of the lower part of the feeder on the line 7—7 of Figure 4, the movable parts at the left-hand end of the figure being shown in positions they will at times occupy when a hog is feeding from the associated feed compartment; Figure 8 is a view partly in elevation and partly in section on the line 8—8 of Figure 7; and Figure 9 is a detail view on the line 9—9 of Figure 4 and showing the position of the roof hinge arm when the roof is in closed position.

The feeder comprises two main sections, a longitudinal base section 1 containing feed distributing means (to be described) and superimposed thereon a longitudinal feed hopper section 2. The latter is hinged to the former by means of hinges 3 affixed at one end to wall 4 of the hopper and one end to wall 25 of the base section. The hopper is rotatable on these hinges from a horizontal operative position wherein the hopper is in communication with the feed distributing means of the base section to a vertical position (dotted lines of Fig. 1) wherein the feed distributing means are readily accessible for cleaning and the like. The hopper section 2 is locked in the horizontal operative position by cooperating hinge type elements 24 affixed at the other end walls 4A and 25A of the hopper and base respectively. Readily removable pintles having bent ends 19 cooperate with elements 24 for locking action. The bent ends of the pintles facilitate withdrawal.

2

The hopper comprises downwardly converging side walls 5 secured between the end walls 4 and 4A. The side walls 5 are spaced apart at the bottom for discharge of feed therethrough. A roof 17 for the hopper is hinged thereto by hinge arms 6 affixed to the roof and pivoted upon hopper end walls 4 and 4A. The shape of the arms 6 and location of pivots 26 is related as shown in Fig. 3 to provide a self-holding stop for the roof when in its open position. A clamp 7 cooperates with a projection 27 to securely fasten the roof in closed position. As shown, the roof is of arcuate shape and has gutters 18 on its side edges which prevent rain water falling thereon from running down the sides of the feeder.

The base section 1 comprises a floor 8 secured upon longitudinal runners 29. The runners, floor and end walls 25 and 25A are bolted together and secured by suitably conformed lower leaf members 31 of hinges 3 and lower leaf members 33 of locking elements 24 which leaf members extend under the runners (Figs. 1 and 5). A pan 35 rests upon floor 8 centrally positioned beneath the converging hopper side walls 5. Vertical strips 36 secured to the longitudinal edges of the pan also rest upon floor 8. Parallel longitudinally spaced divider elements 9 are located in the pan to partition it transversely into a plurality of feeding compartments C, each accessible at the front end 37 to an animal and supplied with feed at the rear end 38 from the hopper.

A pair of rods 10, extending lengthwise within the base section, are supported from the divider elements 9 and on opposite sides of the hopper by means of apertured plates 21 secured across the top of the dividers. The rods constitute pivot supports for feed compartment covers 16, the covers being formed with eyes 39 receiving one of the rods. The sides of the covers 16 are formed as indicated at 23 in Fig. 8 to provide gutters for preventing rain from entering the feed compartments, and permitting independent opening of any one cover.

Each feed compartment also has a feed gate 11 pivotally carried by brackets 41 affixed at the upper end of the feed gate. The brackets have outwardly projecting wings 43 which are apertured to receive one of the rods 10 on opposite sides of the eyes 39 of covers 16. Adjustable extension plates are fastened to the lower free ends of gates 11 by means of a slot and bolt arrangement indicated at 45 (Fig. 7). The rate of feed into the individual feeding compartment is adjustably controlled by varying the effective length of the gates by means of extensions 12.

The feed gate brackets 41 also have inwardly directed wings 13 on which are supported feed agitator elements 14. The latter, being formed with lugs 47 at their lower extremities, are selectively pivoted in one of three sets of apertures 49 in wings 13, and reach upwardly into the hopper when it is in the horizontal operative position. Feed agitator bars 15 are secured along the upper reaches of the elements 14. In normal operation, the agitators lie against and move on the adjacent wall 5 of the hopper (left hand side of Fig. 7), but may swing inwardly (right hand side of Fig. 7) when the hopper is turned back on its hinges 3.

In operation of the device, a hog lifts one of the covers 16 with its nose to gain access to the feed and during feeding will push the feed gate inwardly. Wings 13 are thereby swung upwardly to lift the associated agitator an amount determined by the selection of apertures 49. The feed thus disturbed, both by movement of the feed gate and the agitator, flows beneath the gate extension 12 to replenish the feed in the compartment.

A pair of guard rails 51 are fastened to the side walls 5 of the hopper, which rails project over and around the rods 10. These guard rails protect the feed compartments from rain and also serve to maintain the pan 9 centrally positioned beneath the hopper. The pan is removable when the hopper is turned back from the base section.

It will be noted that the feed distributing means, including agitators 14 and feed gates 11, are readily rendered accessible by merely turning the hopper element backward on its hinges. The feed gates may then be swung inwardly considerably beyond the extent otherwise possible. Movement of the feed gates is normally limited by engagement of wings 13 with the bottom of side walls 5. Furthermore, upon lifting one end of the pan 9, either of the rods 10 may be withdrawn and any part carried by the rod may be removed. It is necessary to lift the pan and the parts carried thereby to clear the rods for withdrawal over the end walls of the base section.

Having fully described our invention, that which we claim as novel and desire to protect by Letters Patent of the United States is:

1. A feeder comprising a longitudinal base section and a feed hopper separable therefrom, said base section being transversely divided into a plurality of feed compartments, a feed gate element and a cover for each compartment, a rod removably mounted on the base section and extending across all of the compartments, said feed gate element and covers being pivotally and separably mounted on said rod, and feed agitating elements each pivotally mounted on a feed gate and extending into the hopper.

2. A feeder comprising a base having a row of upwardly opening feed compartments, each compartment having a front end accessible for feeding purposes and a rear end adapted to be supplied with feed, a feed hopper mounted on the base for supplying feed to the rear ends of all the compartments, a pivot rod removably mounted on the base and extending across all of the compartments adjacent their rear upper ends, a cover for each compartment removably mounted at its rear end on the rod, and a feed gate for each compartment removably mounted at its upper end on the rod.

3. A feeder comprising a longitudinal base transversely partitioned to provide a plurality of aligned upwardly opening feed compartments, a plurality of feed agitators reaching upwardly and supported from the base, said agitators being aligned longitudinally of the base and a longitudinal feed hopper pivoted at one of its ends to one end of the base for swinging movement from a position wherein said feed agitators reach into hopper to a position permitting access to said agitators.

4. A feeder comprising a longitudinal base transversely partitioned into a plurality of aligned feed compartments, a longitudinal feed hopper pivoted at one of its ends to one end of the base for swinging movement from an operative position over the base to a position clear of the base, said hopper having downwardly converging side walls spaced apart at the bottom, a plurality of aligned feed agitators reaching upwardly from the base into said hopper when the hopper is in its operative position over the base, and said agitators being pivotally supported at their lower ends for swinging movement from a position wherein the agitators lie against the converging side walls of the hopper to a position permitting the hopper to be swung clear of said agitators.

5. A feeder comprising a base section a feed pan removably supported in said base section and having a row of upwardly opening feed compartments, each feed compartment having a front end accessible for feeding purposes and a rear end adapted to be supplied with feed, a feed hopper pivoted on said base section for swinging movement from an operative position over said base to a position clear of said base, said hopper having lower edges cooperable with said feed pan maintaining the pan in the base section when the hopper is in the operative position, a pivot rod removably mounted on the feed pan and extending across all compartments between the front and rear upper ends thereof, a cover for each compartment removably mounted on said rod and extending to the front end of the compartment, a feed gate for each compartment removably mounted on said rod and depending into the compartment, and feed agitators supported upon the feed gates and reaching upwardly into the hopper when the hopper is in the operative position.

GLENN C. PITTENGER.
DEXTER R. THORNHILL.

REFERENCES CITED

The following references are of record in the file of this patent:

UNITED STATES PATENTS

| Number | Name | Date |
|---|---|---|
| 920,806 | Wright | May 4, 1909 |
| 1,718,472 | McCollough | June 25, 1927 |
| 1,701,338 | Rowles | Feb. 5, 1929 |
| 1,907,372 | Stolp | May 2, 1933 |
| 1,910,596 | Einsel et al. | May 23, 1933 |
| 2,163,186 | Bergeron | June 20, 1939 |